United States Patent
Shih et al.

(10) Patent No.: US 8,547,490 B2
(45) Date of Patent: Oct. 1, 2013

(54) THREE-DIMENSIONAL IMAGING DEVICE

(75) Inventors: Mei-Sha Shih, Kaohsiung (TW);
Chun-Wei Su, New Taipei (TW);
Jan-Tien Lien, Keelung (TW)

(73) Assignee: Chunghwa Picture Tubes. Ltd., Taoyuan (TW)

( * ) Notice: Subject to any disclaimer, the term of this patent is extended or adjusted under 35 U.S.C. 154(b) by 37 days.

(21) Appl. No.: 13/471,815

(22) Filed: May 15, 2012

(65) Prior Publication Data
US 2013/0169895 A1    Jul. 4, 2013

(30) Foreign Application Priority Data
Jan. 4, 2012 (TW) .............................. 101200165 A

(51) Int. Cl.
*G02F 1/1335* (2006.01)
(52) U.S. Cl.
USPC ................................ 349/15; 349/13; 349/115
(58) Field of Classification Search
None
See application file for complete search history.

(56) References Cited

U.S. PATENT DOCUMENTS

| 8,149,343 B2 * | 4/2012 | Choi et al. ............. 349/15 |
| 2011/0007246 A1 | 1/2011 | Moon |

FOREIGN PATENT DOCUMENTS

| TW | 200941073 | 10/2009 |
| TW | 201024844 | 7/2010 |

OTHER PUBLICATIONS

English translation of abstract of TW 201024844.
English translation of abstract of TW 200941073.

* cited by examiner

*Primary Examiner* — Richard Kim
(74) *Attorney, Agent, or Firm* — CKC & Partners Co., Ltd.

(57) ABSTRACT

A three-dimensional imaging device is provided which includes a display device and a viewing device. The display device includes a first substrate, a second substrate, a black absorbing layer and a cholesteric liquid crystal layer including a first levo-cholesteric liquid crystal layer and a first dextro-cholesteric liquid crystal layer. The viewing device includes a second levo-cholesteric liquid crystal layer and a second dextro-cholesteric liquid crystal layer. The first levo-cholesteric liquid crystal layer is made of a same material as the second levo-cholesteric liquid crystal layer, and the first dextro-cholesteric liquid crystal layer is made of a same material as the second dextro-cholesteric liquid crystal layer.

10 Claims, 2 Drawing Sheets

THREE-DIMENSIONAL IMAGING DEVICE

RELATED APPLICATIONS

This application claims priority to Taiwan Application Serial Number 101200165, filed Jan. 4, 2012, which is herein incorporated by reference.

BACKGROUND

1. Technical Field

The present invention relates to a three-dimensional (3D) imaging display device. More particularly, the present invention relates to a three-dimensional imaging display device having cholesteric liquid crystal (CLC).

2. Description of Related Art

In recent years, the development of the display technology has been focused on a 3D display technique, which is realized by using parallax of human eyes to provide two different images to two eyes, thereby generating a 3D sense of view. The 3D display technique is primarily classified into two categories: viewing through glasses (glass type), such as polarized glasses, and viewing with naked eyes (auto-stereoscopic type). The principle of the 3D display technique of viewing through the glasses uses a display device shows respective images for left and right eyes, and the two eyes of a viewer then separately see the respective images filtered by the glasses, thereby forming the 3D sense of view.

The polarized glasses mentioned above may be linearly polarized glasses or circularly polarized glasses. The lenses of the circularly polarized glasses are generally composed of linearly polarized plates and phase retardation films. However, chromatic aberrations will be observed in images of the conventional 3D display device when light of the images passes the circularly polarized glasses used with the 3D display device, in that the phase retardation of the display device is determined by liquid crystal. Accordingly, the chromatic aberrations occur while the phase retardation of the polarized glasses is different from the phase retardation of the display device.

SUMMARY

An aspect of the present invention is to provide a 3D imaging device which includes a display device and a viewing device. The display device includes a first substrate, a second substrate, a CLC layer and a black absorbing layer. The second substrate is paralleled to the first substrate. The black absorbing layer is disposed on the second substrate. The cholesteric liquid crystal layer is disposed between the black absorbing layer and the first substrate. The cholesteric liquid crystal layer includes a first levo-cholesteric liquid crystal layer and a first dextro-cholesteric liquid crystal layer to display a first image and a second image respectively. The first levo-cholesteric liquid crystal layer and the first dextro-cholesteric liquid crystal layer are disposed on a same plane. The viewing device includes a second levo-cholesteric liquid crystal layer and a second dextro-cholesteric liquid crystal layer enabling light of the first and the second images to respectively pass through the second levo-cholesteric liquid crystal layer and the second dextro-cholesteric liquid crystal layer and then to reach a viewer's eyes. The first levo-cholesteric liquid crystal layer is made of a same material as the second levo-cholesteric liquid crystal layer, and the first dextro-cholesteric liquid crystal layer is made of a same material as the second dextro-cholesteric liquid crystal layer.

In one embodiment, both the first levo-cholesteric liquid crystal layer and the second levo-cholesteric liquid crystal layer have a substantially same first phase retardation, and both the first dextro-cholesteric liquid crystal layer and the second dextro-cholesteric liquid crystal layer have a substantially same second phase retardation.

In one embodiment, the viewing device further includes a transparent rigid substrate, and the second levo-cholesteric liquid crystal layer and the second dextro-cholesteric liquid crystal layer are disposed on the transparent rigid substrate.

In one embodiment, the second levo-cholesteric liquid crystal layer includes a plurality of color levo-cholesteric liquid crystal layers stacked in parallel to each other, and the second dextro-cholesteric liquid crystal layer includes a plurality of color dextro-cholesteric liquid crystal layers stacked in parallel to each other.

In one embodiment, the second levo-cholesteric liquid crystal layer includes a red levo-cholesteric liquid crystal layer, a green levo-cholesteric liquid crystal layer and a blue levo-cholesteric liquid crystal layer stacked in parallel to each other, and the second dextro-cholesteric liquid crystal layer includes a red dextro-cholesteric liquid crystal layer, a green dextro-cholesteric liquid crystal layer and a blue dextro-cholesteric liquid crystal layer stacked in parallel to each other.

In one embodiment, the second levo-cholesteric liquid crystal layer and the second dextro-cholesteric liquid crystal layer are in form of films.

In one embodiment, the viewing device further includes a plurality of liquid crystal cells for containing the second levo-cholesteric liquid crystal layer and the second dextro-cholesteric liquid crystal layer.

In one embodiment, the second levo-cholesteric liquid crystal layer and the second dextro-cholesteric liquid crystal layer are in liquid crystal state.

In one embodiment, the first levo-cholesteric liquid crystal layer includes a red levo-cholesteric liquid crystal, a green levo-cholesteric liquid crystal and a blue levo-cholesteric liquid crystal, and the first dextro-cholesteric liquid crystal layer includes a red dextro-cholesteric liquid crystal, a green dextro-cholesteric liquid crystal and a blue dextro-cholesteric liquid crystal.

In one embodiment, the first levo-cholesteric liquid crystal layer and the first dextro-cholesteric liquid crystal layer are in liquid crystal state.

As aforementioned, the phase retardations of the display device and the viewing device are substantially the same, thereby solving the problem of chromatic aberrations between conventional display devices and polarized glasses.

BRIEF DESCRIPTION OF THE DRAWINGS

The invention may be more fully understood by reading the following detailed description of the embodiment, with reference made to the accompanying drawings as follows.

DETAILED DESCRIPTION

Figure 1A:
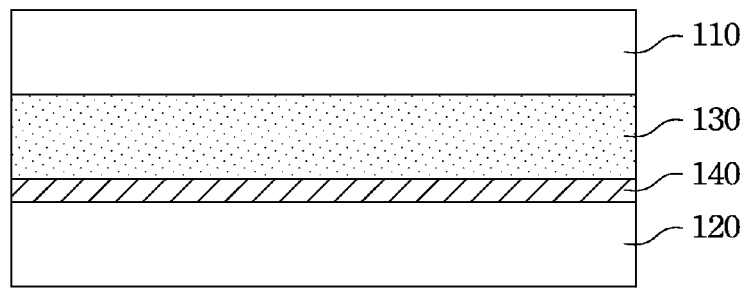
FIG. 1A to FIG. 1B are cross-sectional views of a display device according to one embodiment of the present invention.

The present invention is described by the following specific embodiments. Those with ordinary skill in the arts can readily understand the other advantages and functions of the present invention after reading the invention of this specification. The present invention can also be implemented with different embodiments. Various details described in this specification can be modified based on different viewpoints and applications without departing from the scope of the present invention.

Reference will now be made in detail to the embodiments of the present invention, examples of which are illustrated in the accompanying drawings. Wherever possible, the same reference numbers are used in the drawings and the description to refer to the same or like parts.

Figure 1B:
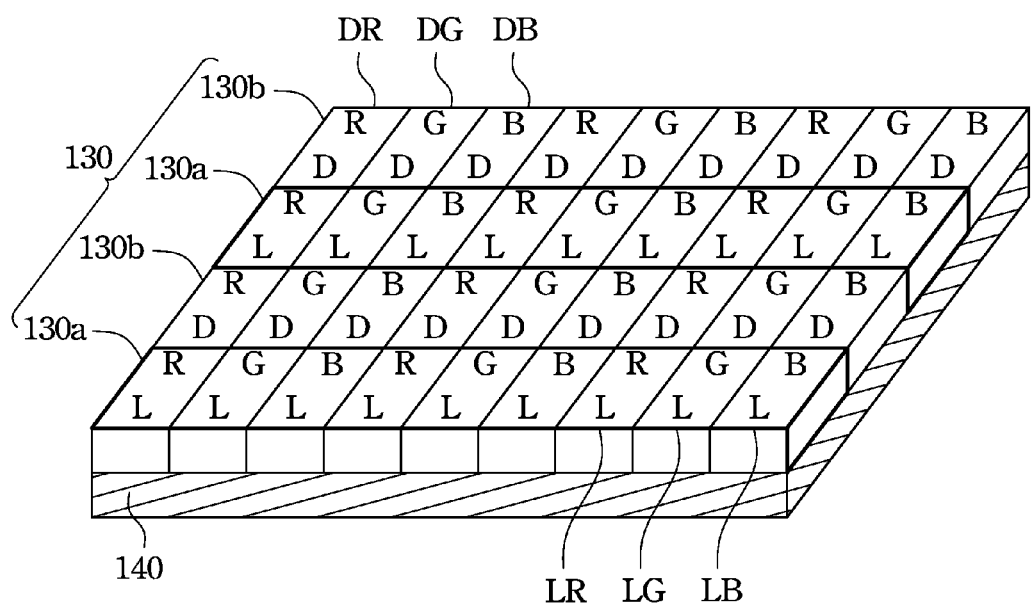

An embodiment of the present invention provides a 3D imaging device which includes a display device and a viewing device. FIG. 1A to FIG. 1B are cross-sectional views of a display device according to one embodiment of the present invention. The display device 100 includes a first substrate 110, a second substrate 120, a CLC layer 130 and a black absorbing layer 140. The display device 100 may be a reflective cholesteric liquid crystal display device without a backlight unit. The first substrate 110 may be a glass substrate having electrodes. The second substrate 120 may be paralleled to the first substrate 110. The second substrate 120 may be an active array substrate. The black absorbing layer 140 is disposed on the second substrate 120, and is capable of absorbing the light transmitted through the CLC layer 130 and displaying a black color. The CLC layer 130 is disposed between the black absorbing layer 140 and the first substrate 110. The electrodes for controlling arrangement of CLC molecules may be selectively disposed on the first substrate 110 or the second substrate 120 according to electric field drive modes. The arranged states of the CLC molecules are used to control light transmission ratio. For instance, the CLC molecules in a planar state are well ordered for reflecting light of a predetermined wavelength range. The CLC molecules in a focal conic state are disordered to scatter incident light. The CLC molecules in a homeotropic state are vertically arranged for allowing light to completely go through. Furthermore, the display device 100 does not include a polarizer plate and a color filter.

As shown in FIG. 1B, the CLC layer 130 includes a first levo-CLC layer 130a and a first dextro-CLC layer 130b to display a first image and a second image respectively. Both the first levo-CLC layer 130a and the first dextro-CLC layer 130b are disposed on a same plane. While environmental light enters the CLC layer 130, the first levo-CLC layer 130a and the first dextro-CLC layer 130b may reflect left-handed and right-handed circularly polarized light respectively. In addition, the first levo-CLC layer 130a and the first dextro-CLC layer 130b separately allow the right-handed and the left-handed circularly polarized light to pass therethrough. The black absorbing layer 140 may absorb the transmitted left-handed and right-handed circularly polarized light. The characteristics of the first-levo CLC layer 130a and the first dextro-CLC layer 130b may be applied in the 3D display technology. Therefore, the CLC layer 130 is provided for reflecting the first and the second image with different optical features.

The first levo-CLC layer 130a may includes a red levo-cholesteric liquid crystal (LR), a green levo-CLC (LG) and a blue levo-CLC (LB). The first dextro-CLC layer 130b includes a red dextro-CLC (DR), a green dextro-CLC (DG) and a blue dextro-CLC (DB). The displaying features of the CLC will be described below. LR in the planar state reflects red left-handed circularly polarized light and permits right-handed circularly polarized light to pass therethrough. Also, LG and LB reflect green and blue left-handed circularly polarized light respectively. DR in the planar state reflects red right-handed circularly polarized light and enables left-handed circularly polarized light to go therethrough. Similarly, DG and DB reflects green and blue right-handed circularly polarized light respectively. In view of above, a liquid crystal array constructed by the CLC reflects color images of the left-handed and right-handed circularly polarized light.

The first levo-CLC layer 130a and the first dextro-CLC layer 130b are in liquid crystal state. For instance, the levo-CLC and dextro-CLC with various colors may be respectively accommodated in a plurality of spaces of a liquid crystal cell array (not shown) for constructing the liquid crystal array shown in FIG. 1B. As an example, the levo-CLC and the dextro-CLC may be respectively arranged in odd columns and even columns of the liquid crystal cell array.

Figure 2A:
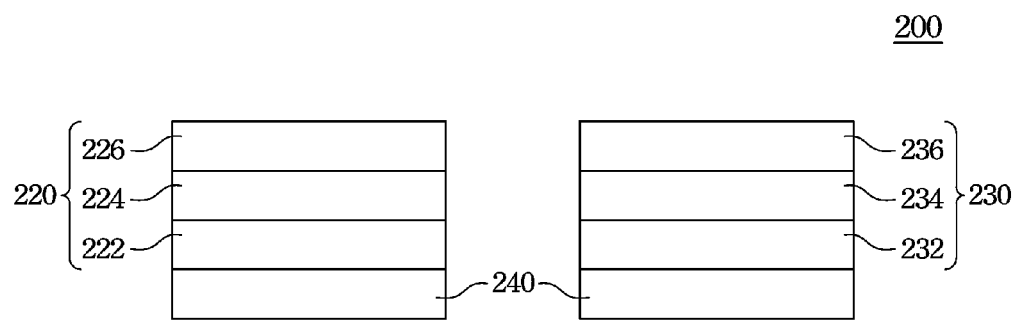
FIG. 2A to FIG. 2B are cross-sectional views of a viewing device according to one embodiment of the present invention.
Figure 2B:
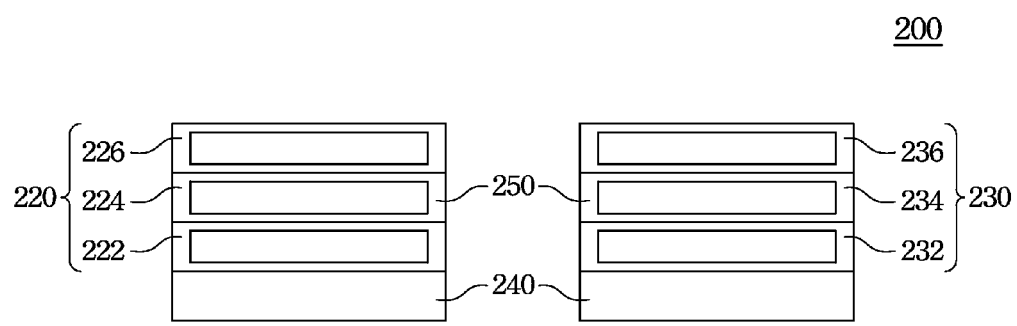

FIG. 2A to FIG. 2B are cross-sectional views of a viewing device according to one embodiment of the present invention. The viewing device 200 includes a second levo-CLC layer 220 and a second dextro-CLC layer 230 enabling light of the first and the second images to separately pass through the layers and then to reach a viewer's eyes. The first-levo CLC layer 130a may be made of a same material as the second levo-CLC layer 220. The first dextro-CLC layer 130b may be made of a same material as the second dextro-CLC layer 230.

The CLC molecules exhibit birefringence such that CLC layer having a certain thickness has a phase retardation. In one embodiment, both the first-levo CLC layer 130a and the second levo-CLC layer 220 have a substantially same first phase retardation, and both the first dextro-CLC layer 130b and the second dextro-CLC layer 230 have a substantially same second phase retardation. Consequently, a problem of chromatic aberrations generated between conventional display devices and polarized glasses can be solved. The second levo-CLC layer 220 and the second dextro-CLC layer 230 may be in a form of films or liquid crystal. In one embodiment, the viewing device 200 further includes liquid crystal cells 250 for containing the second levo-CLC layer 220 and the second dextro-CLC layer 230, as shown in FIG. 2B. One CLC layer, which is in the form of the film, may have a substantially same phase retardation as another CLC layer, which is in the liquid crystal state, by controlling the film thickness.

The viewing device 200 may be eyeglasses with a frame. The second levo-CLC layer 220 and the second dextro-CLC layer 230 may be disposed in the two accommodating spaces of the frame respectively. The viewer's eyes may respectively see the first and the second image by the second levo-CLC layer 220 and the second dextro-CLC layer 230.

In one embodiment, the viewing device 200 may further include a transparent rigid substrate 240. As depicted in FIGS. 2A-2B, the second levo-CLC layer 220 and the second dextro-CLC layer 230 may be disposed on the transparent rigid substrate 240. The transparent rigid substrate 240, such as glass, is provided for supporting those layers.

In one embodiment, the second levo-CLC layer 220 includes a plurality of color levo-CLC layers stacked in parallel to each other, and the second dextro-CLC layer 230 also includes a plurality of color dextro-CLC layers stacked in parallel to each other. A stacking order of color CLC layers is not limited herein. The color levo-CLC layers may include a red, a green and a blue levo-CLC layer 222, 224, and 226. The second dextro-CLC layer may include a red, a green and a blue dextro-CLC layer 232, 234, and 236.

The CLC layers in the viewing device 200 may partially transmit and partially reflect light. For instance, the red levo-CLC layer 222 may transmit a part of the red left-handed circularly polarized light and reflect another part thereof. In theory, the red levo-CLC layer 222 can transmit 50 percent of the red left-handed circularly polarized light and reflect 50 percent thereof. Moreover, the red levo-CLC layer 222 may completely transmit the green and the blue left-handed circularly polarized light. Similarly, the green and the blue levo-CLC layer 224, 226 may transmit a part of the green and a part of the blue left-handed circularly polarized light respectively. Therefore, one eye of a viewer may see the transmitted red, green and blue left-handed circularly polarized light. The red dextro-CLC layer 232 may transmit a part of the red right-handed circularly polarized light and reflect another part thereof. In addition, the red dextro-CLC layer 232 may completely transmit the green and the blue right-handed circularly polarized light. Likewise, the green and the blue dextro-CLC layer 234, 236 may transmit a part of the green and a part of the blue right-handed circularly polarized light respectively. Consequently, the other eye of the viewer may see the transmitted red, green and blue right-handed circularly polarized light. As mentioned above, the two eyes may respectively see color images of the left-handed and the right-handed circularly polarized light.

The color images of the left-handed and the right-handed circularly polarized light may pass through the second levo-CLC layer 220 and the second dextro-CLC layer 230, respectively, and then to reach viewer's eyes.

Since the images of the left-handed and the right-handed circularly polarized light respectively have substantially the same phase retardations as the second levo-CLC layer 220 and the second dextro-CLC layer 230 to solve the problem of the chromatic aberrations.

It will be apparent to those ordinarily skilled in the art that various modifications and variations may be made to the structure of the present invention without departing from the scope or spirit of the invention. In view of the foregoing, it is intended that the present invention cover modifications and variations thereof provided they fall within the scope of the following claims.

What is claimed is:

1. A three-dimensional imaging device, comprising:
   a display device comprising:
      a first substrate;
      a second substrate paralleled to the first substrate;
      a black absorbing layer disposed on the second substrate;
      a cholesteric liquid crystal layer disposed between the black absorbing layer and the first substrate, wherein the cholesteric liquid crystal layer includes a first levo-cholesteric liquid crystal layer and a first dextro-cholesteric liquid crystal layer to display a first image and a second image respectively, and the first levo-cholesteric liquid crystal layer and the first dextro-cholesteric liquid crystal layer are disposed at a same plane; and
   a viewing device comprising:
      a second levo-cholesteric liquid crystal layer and a second dextro-cholesteric liquid crystal layer enabling light of the first image and the second image to respectively pass through the second levo-cholesteric liquid crystal layer and the second-dextro cholesteric liquid crystal layer and then to reach a viewer's eyes, wherein the first levo-cholesteric liquid crystal layer is made of a same material as the second levo-cholesteric liquid crystal layer, and the first dextro-cholesteric liquid crystal layer is made of a same material as the second dextro-cholesteric liquid crystal layer.

2. The device of claim 1, wherein both the first levo-cholesteric liquid crystal layer and the second levo-cholesteric liquid crystal layer have a first phase retardation, and both the first dextro cholesteric liquid crystal layer and the second dextro cholesteric liquid crystal layer have a second phase retardation.

3. The device of claim 1, wherein the viewing device further comprises a transparent rigid substrate, and the second levo-cholesteric liquid crystal layer and the second dextro-cholesteric liquid crystal layer are disposed over the transparent rigid substrate.

4. The device of claim 1, wherein the second levo-cholesteric liquid crystal layer comprises a plurality of color levo-cholesteric liquid crystal layers stacked in parallel to each other, and the second dextro-cholesteric liquid crystal layer comprises a plurality of color dextro-cholesteric liquid crystal layers stacked in parallel to each other.

5. The device of claim 1, wherein the second levo-cholesteric liquid crystal layer comprises a red levo-cholesteric liquid crystal layer, a green levo-cholesteric liquid crystal layer and a blue levo-cholesteric liquid crystal layer stacked in parallel to each other, and the second dextro cholesteric liquid crystal layer comprises a red dextro-cholesteric liquid crystal layer, a green dextro-cholesteric liquid crystal layer and a blue dextro-cholesteric liquid crystal layer stacked in parallel to each other.

6. The device of claim 1, wherein the second levo-cholesteric liquid crystal layer and the second dextro-cholesteric liquid crystal layer are in the form of films.

7. The device of claim 1, wherein the viewing device further comprises a plurality of liquid crystal cells for containing the second levo-cholesteric liquid crystal layer and the second dextro-cholesteric liquid crystal layer.

8. The device of claim 7, wherein the second levo-cholesteric liquid crystal layer and the second dextro-cholesteric liquid crystal layer are in liquid crystal state.

9. The device of claim 1, wherein the first levo-cholesteric liquid crystal layer comprises a red levo-cholesteric liquid crystal, a green levo-cholesteric liquid crystal and a blue levo-cholesteric liquid crystal, and the first dextro-cholesteric liquid crystal layer comprises a red dextro-cholesteric liquid crystal, a green dextro-cholesteric liquid crystal and a blue dextro-cholesteric liquid crystal.

10. The device of claim 1, wherein the first levo-cholesteric liquid crystal layer and the first dextro-cholesteric liquid crystal layer are in liquid crystal state.

\* \* \* \* \*